(12) United States Patent
Smith et al.

(10) Patent No.: US 7,373,944 B2
(45) Date of Patent: May 20, 2008

(54) PYROTECHNIC RELIEF VALVE

(75) Inventors: Bradley W. Smith, Ogden, UT (US);
Matthew A. Cox, Centerville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 378 days.

(21) Appl. No.: 11/023,155

(22) Filed: Dec. 27, 2004

(65) Prior Publication Data
US 2006/0137742 A1   Jun. 29, 2006

(51) Int. Cl.
*F16K 17/40* (2006.01)
(52) U.S. Cl. ............... 137/68.13; 137/68.3; 220/89.3
(58) Field of Classification Search ........... 137/68.13, 137/68.29, 68.3; 220/89.3, 277
See application file for complete search history.

(56) References Cited

U.S. PATENT DOCUMENTS

| | | | | |
|---|---|---|---|---|
| 2,417,374 | A * | 3/1947 | Morton | 169/26 |
| 3,712,319 | A * | 1/1973 | Rhodes et al. | 137/68.3 |
| 4,245,660 | A * | 1/1981 | Rozniecki | 137/68.13 |
| 4,267,702 | A * | 5/1981 | Houk | 62/115 |
| 5,515,691 | A | 5/1996 | Wertenbach et al. | |
| 5,577,389 | A * | 11/1996 | Albertson et al. | 62/115 |
| 5,673,563 | A * | 10/1997 | Albertson et al. | 62/56 |
| 5,782,486 | A * | 7/1998 | Barnes et al. | 280/737 |
| 6,240,738 | B1 | 6/2001 | Kato et al. | |
| 2005/0061010 | A1* | 3/2005 | Mu et al. | 62/149 |
| 2007/0169827 | A1* | 7/2007 | Reck | 137/887 |

FOREIGN PATENT DOCUMENTS

DE   4207859   9/1993
EP   1 580 051 A2 *   9/2005

* cited by examiner

*Primary Examiner*—Ramesh Krishnamurthy
(74) *Attorney, Agent, or Firm*—Sally J Brown; Stoel Rives LLP (57) ABSTRACT

A relief valve and related systems and methods are disclosed for use in fluid distribution lines. The relief valve comprises a body defining a cavity and comprising at least first and second openings in fluid communication with the cavity. A connector piece is connected to the body at the first opening to connect the valve to a fluid distribution line. A rupture disc is disposed within and obstructs the first opening. When it is desired that fluid from the fluid distribution line be vented from the system, the rupture disc is punctured and thereby allows for fluid communication through the first opening of the valve.

22 Claims, 10 Drawing Sheets

PYROTECHNIC RELIEF VALVE

TECHNICAL FIELD

The present invention relates generally to the field of relief valves. More specifically, the present invention relates to pyrotechnic relief valves for use in fluid systems such as vehicle refrigerant systems.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

Described below are embodiments of a relief valve that may be used in any system including fluid distribution lines, such as automotive refrigeration lines. Embodiments of the relief valve described hereinafter are typically activated by way of a pyrotechnic initiator that may be deployed by use of an electrical connector.

Figure 1A:
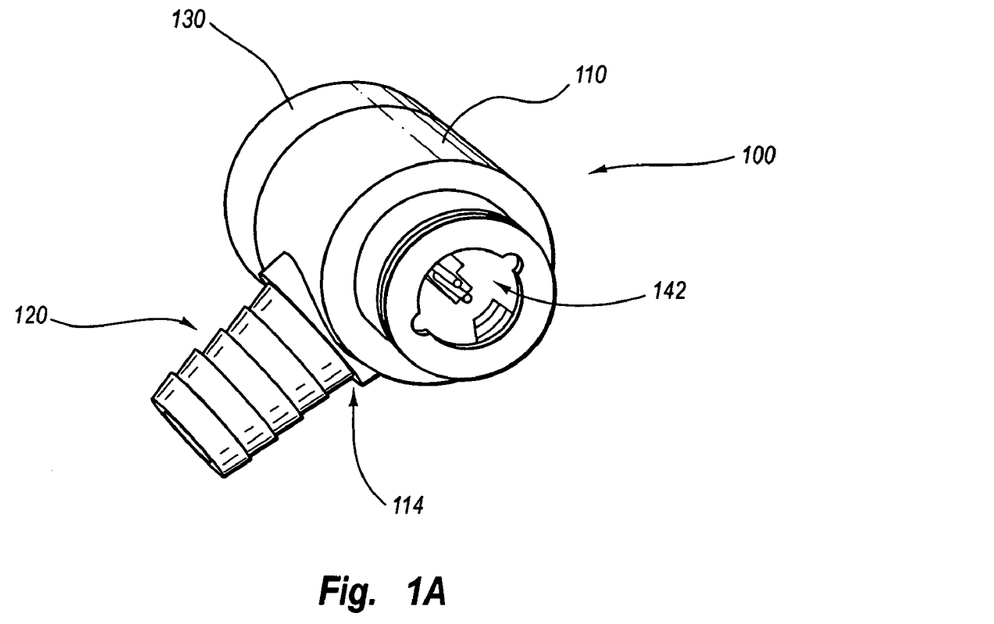
FIG. 1A is a perspective view of one embodiment of a relief valve.
Figure 1B:
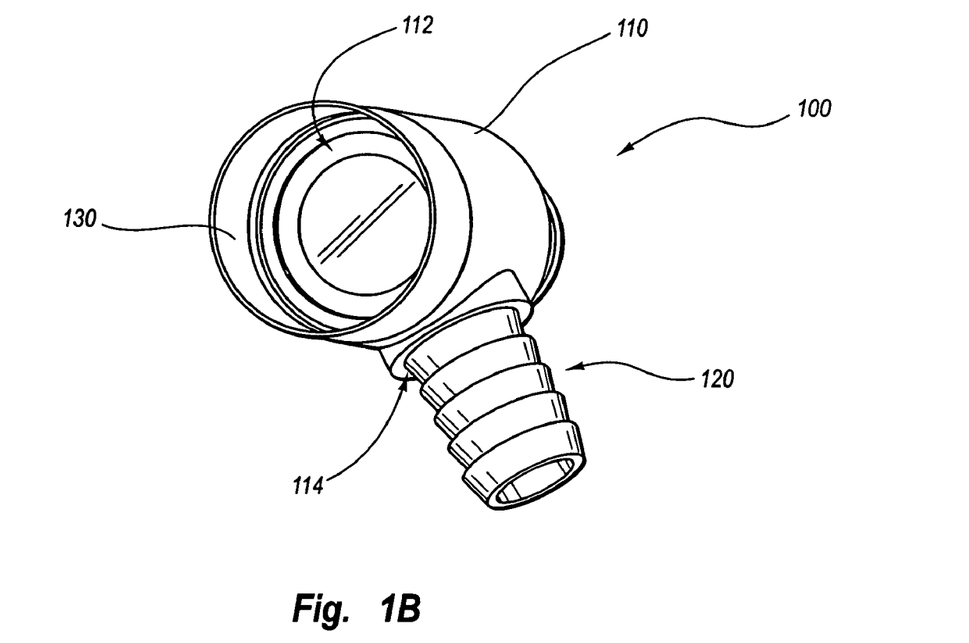
FIG. 1B is a perspective view of the embodiment of FIG. 1A at a different angle.

With reference now to FIGS. 1A and 1B, a relief valve 100 is shown including a body 110 having a first opening 112 and a second opening 114 in fluid communication with a cavity (not shown in FIGS. 1A and 1B) defined by the body 110. Relief valve 100 also includes an electrical activator port 142 adapted to receive an electric connector (not shown). In some embodiments of the invention, body 110 is formed from a plastic material. In other embodiments, body 110 may be formed from a metal or any other suitable material.

In FIGS. 1A and 1B, a hose nipple 120 is shown connected to body 110 at the second opening 114. As will be understood by those having skill in the art, a vent tube may be attached to the hose nipple 120 in order to direct vented fluid—such as refrigerant from an automotive refrigeration line—from the relief valve to a desired location for storing and/or releasing the fluid. Hose nipple 120 may optionally be integrally formed with body 110.

Figure 2A:
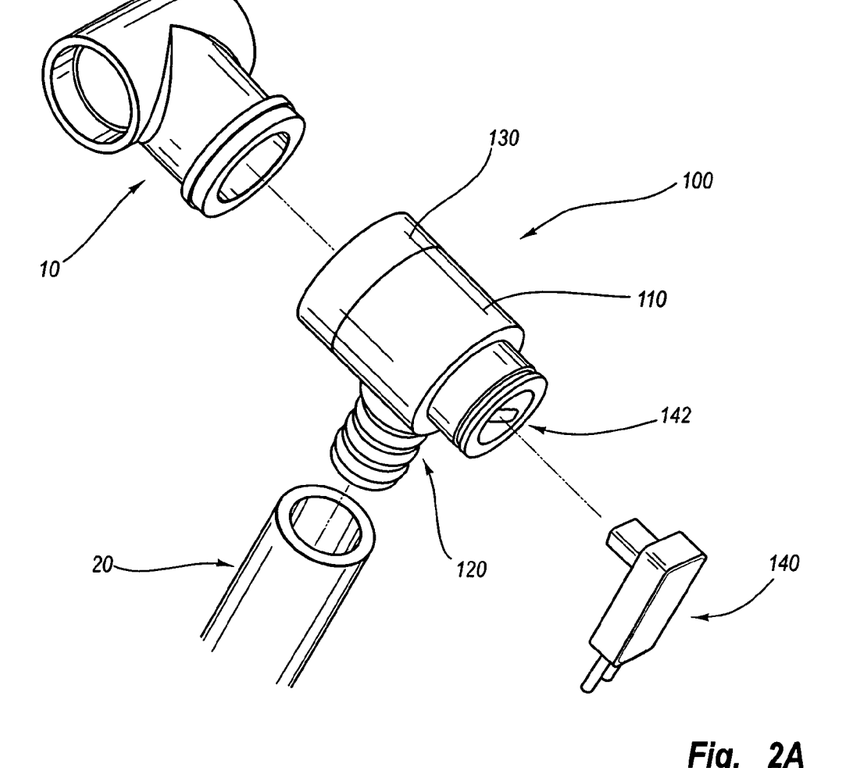
FIG. 2A is an exploded view depicting the relief valve embodiment of FIGS. 1A-1B.
Figure 2B:
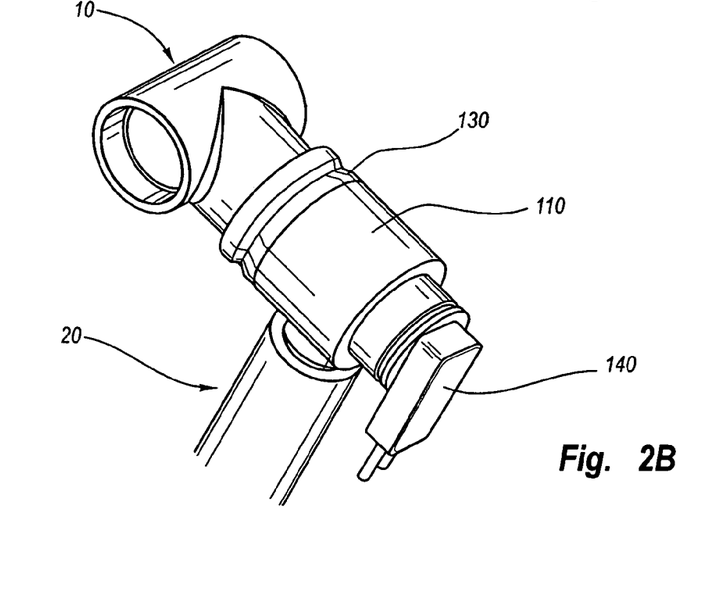
FIG. 2B is a perspective view of the relief valve embodiment of FIG. 2A.
Figure 3:
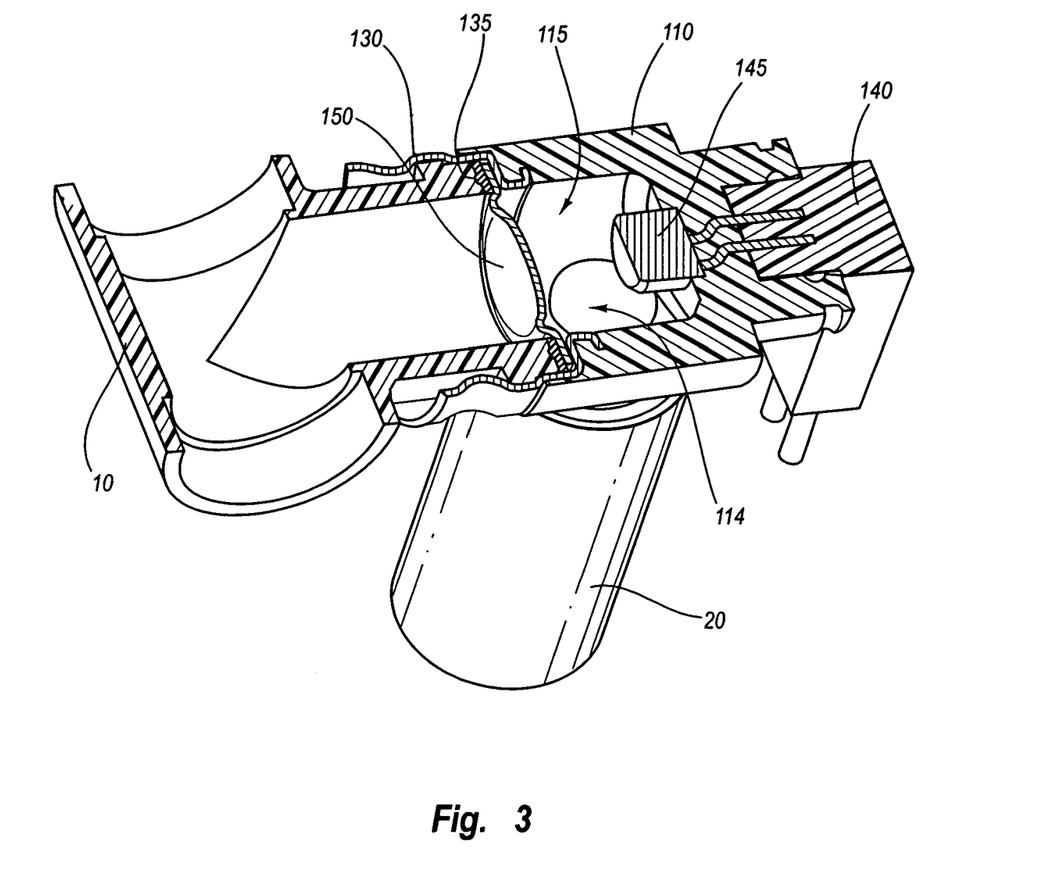
FIG. 3 is a cross-sectional view of a relief valve embodiment connected with a tee fitting.

A connector piece 130 is connected to body 110 at the first opening 112. Connector piece 130 may be integrally molded, threadably attached, or otherwise connected with the body 110. In FIGS. 1-4B and 7-8, the depicted embodiment of connector piece 130 comprises a crimp sleeve. A crimp sleeve typically comprises a permanently deformable material capable of providing a sealing engagement with a tee fitting or other suitable connector to connect the relief valve to a fluid distribution line. It should be understood that the term "tee fitting" does not imply that the fitting must be shaped like the letter "T". Any connector used to divert fluid at an angle from a fluid distribution line should be considered within the scope of this term. As shown in FIGS. 2A-2B and FIG. 3, the depicted crimp sleeve 130 can be positioned over the base of a refrigerant line tee fitting 10 and radially crimped or deformed, as shown in FIG. 2B, to provide a gripping force on tee fitting 10 and provide a seal to prevent whatever fluid is in the distribution line from leaking out. These figures also depict hose nipple 120 fit or being fit with a vent hose 20. Vent hose 20 may extend to any location at which it is desirable to dump or vent the gas released from the relief valve 100.

The embodiments depicted in the accompanying drawings also include an electrical activator 140. As will be described in greater detail below, electrical activator 140 is typically positioned opposite from first opening 112 and is typically connected to a pyrotechnic initiator. Electrical activator 140 is received in port 142.

In the cross-sectional view of FIG. 3, it can be seen that the body 110 of relief valve 100 defines a cavity 115. Extending into cavity 115, and integrally molded with body 110, is a pyrotechnic initiator 145. On the opposite side of cavity 115 from pyrotechnic initiator 145 is a rupture disc 150. Rupture disc 150 is disposed within and is designed to obstruct the first opening 112 in body 110. A sealing washer, such as sealing washer 135 shown in FIG. 3, may be used to facilitate positioning and sealing the rupture disc 150 into the first opening 112. Sealing washer 135 is positioned between tee fitting 10 and rupture disc 150. Rupture disc 150 is an example of valve means for selectively controlling fluid communication through the first opening.

When conditions in the fluid distribution line are such that it is desirable to vent off some of the fluid in the line, a signal is sent to the electrical activator 140. The electrical activator 140 then actuates or deploys the pyrotechnic initiator 145, thereby causing the pyrotechnic initiator 145 to rupture the rupture disc 150. The methodology and structure by which the electrical activator deploys the initiator are well-known in the automotive protective systems industry. Examples of suitable technology for electrically deploying an initiator can be found in U.S. Pat. No. 5,263,740 issued to Frey et al., which is hereby incorporated by reference in its entirety. Once rupture disc 150 has been ruptured, fluid from the refrigerant or other fluid distribution line is able to pass through the first opening 112 and vent out the second opening 114 via the cavity 115. It should be understood that in some embodiments of the invention, an electrical activator may not be necessary and may instead be replaced with a primer or other mechanical activator.

Figure 4A:
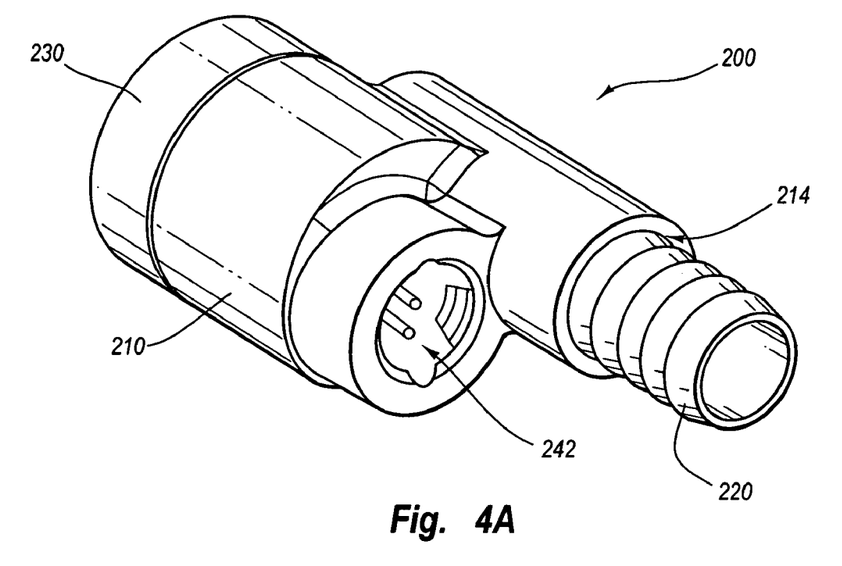
FIG. 4A is a perspective view of another embodiment of a relief valve.
Figure 4B:
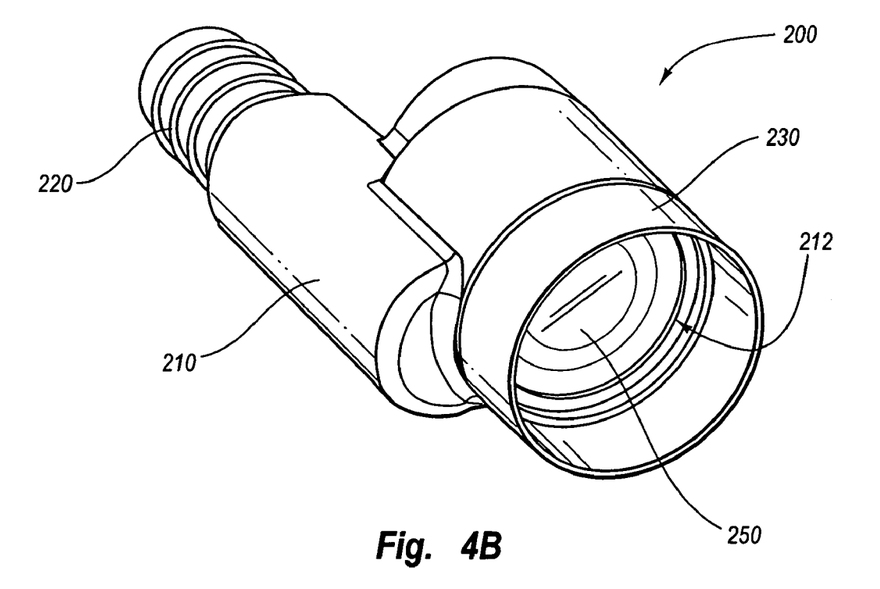
FIG. 4B is a different perspective view of the relief valve embodiment of FIG. 4A.

FIGS. 4A and 4B depict another embodiment of the invention. In relief valve 200 in these figures, the first opening 212 in the body 210 is axially parallel with the second opening 214 instead of being approximately perpendicular thereto as in the embodiment of FIGS. 1-3. Again, this embodiment has a connector piece (crimp sleeve 230), a hose nipple 220, an electrical activator port 242, and a rupture disc 250. The pyrotechnic initiator, although not shown in the figures, is connected with activator 240 and positioned opposite from the rupture disc 250.

In this embodiment, upon deployment of the pyrotechnic initiator, the fluid in the line to which the crimp sleeve 230 is connected can be directed in generally one direction through the relief valve 200 without having to be redirected and exit through the device at an angle with respect to its entry direction into the device. Of course, the relief valve may instead be manufactured such that the two openings are axially aligned with respect to one another instead of parallel to one another if desired.

Figure 5:
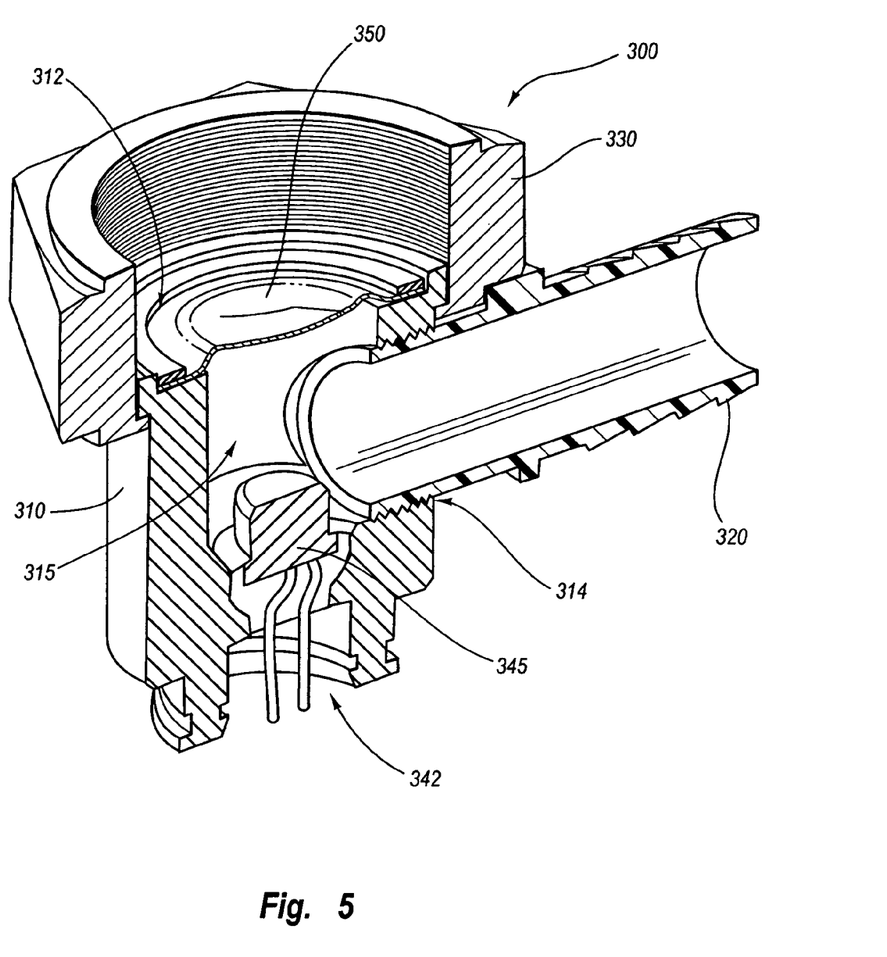
FIG. 5 is a cross-sectional view of still another embodiment of a relief valve.
Figure 6A:
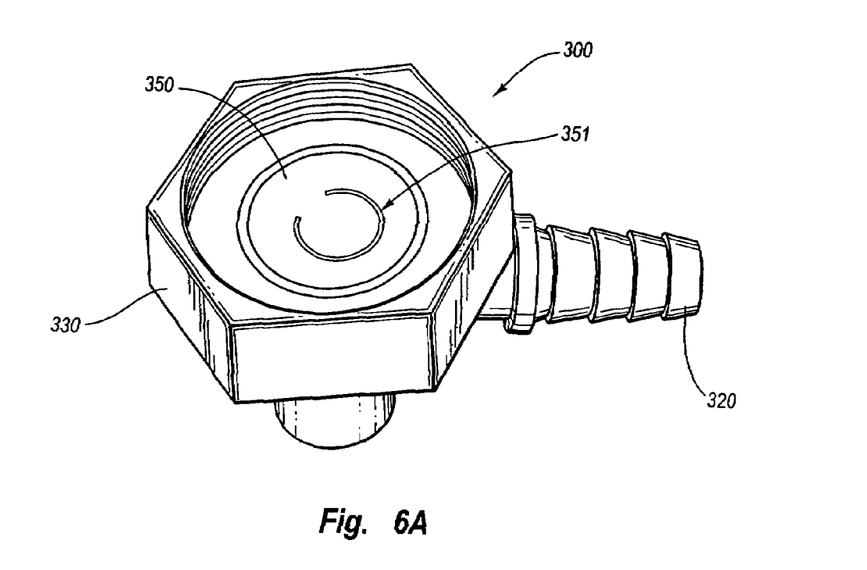
FIG. 6A is a perspective view of the relief valve embodiment of FIG. 5.
Figure 6B:
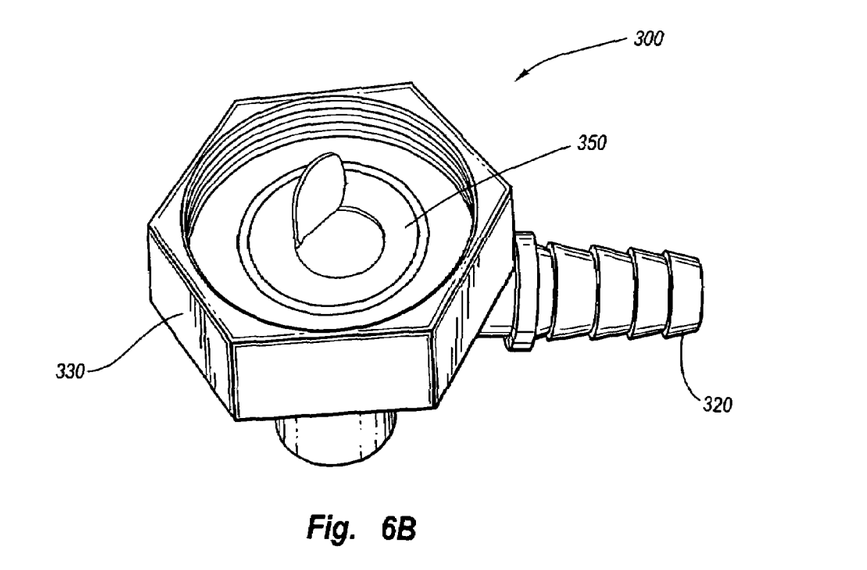
FIG. 6B is a perspective view like that of FIG. 6A with the puncture disc open.

Yet another embodiment of the invention is shown in FIGS. 5 and 6A-6B. In this embodiment, relief valve 300 includes housing 310 having a cavity 315 defined therein. Cavity 315 is in fluid communication with two openings— first opening 312 and second opening 314—in the housing 310. First opening 312 may be threaded to allow for connection with connector piece 330. Connector piece 330 in this embodiment comprises a nut. Crimp sleeve 230 and nut 330 are each examples of connecting means for facilitating a sealing connection with a fluid distribution line.

Nut 330 may optionally be threaded at both ends in order to allow for connection with a fluid distribution line and connection with the body of the valve. Second opening 314 may also be threaded to allow for connection with vent nipple 320. Relief valve 300 also includes a pyrotechnic initiator 345 and a port 342 adapted to receive an electrical activator (not shown). Pyrotechnic initiator 345 is again positioned and aligned such that, upon deployment of the pyrotechnic initiator 345, it will rupture the rupture disc 350 and thereby allow for fluid communication through the first opening 312.

FIG. 6A shows relief valve 300 prior to deployment with rupture disc 350 intact and FIG. 6B shows the same embodiment following deployment. As shown in FIG. 6A, rupture disc 350 may optionally be scored such as is represented by score line 351 to further facilitate rupturing the rupture disc upon deployment of the initiator. Score line 351 is shaped in the form of a circle but does not extend all the way around the perimeter of the defined circle. Such a configuration may be used to allow a flap to be formed in the rupture disc following deployment of the initiator. The flap would remain attached at the unscored portion of the rupture disc. Of course, in embodiments including a scored portion, the scored portion need not be circular in shape. In addition, whatever shape is used, it is not necessary that the score extend all the way around the perimeter of the shape. However, if the score line does fully extend around a perimeter, it is likely that a piece of the rupture disc will be left in the valve following deployment and potentially disrupt or be carried away by the flow of fluid in the fluid system.

Figure 7:
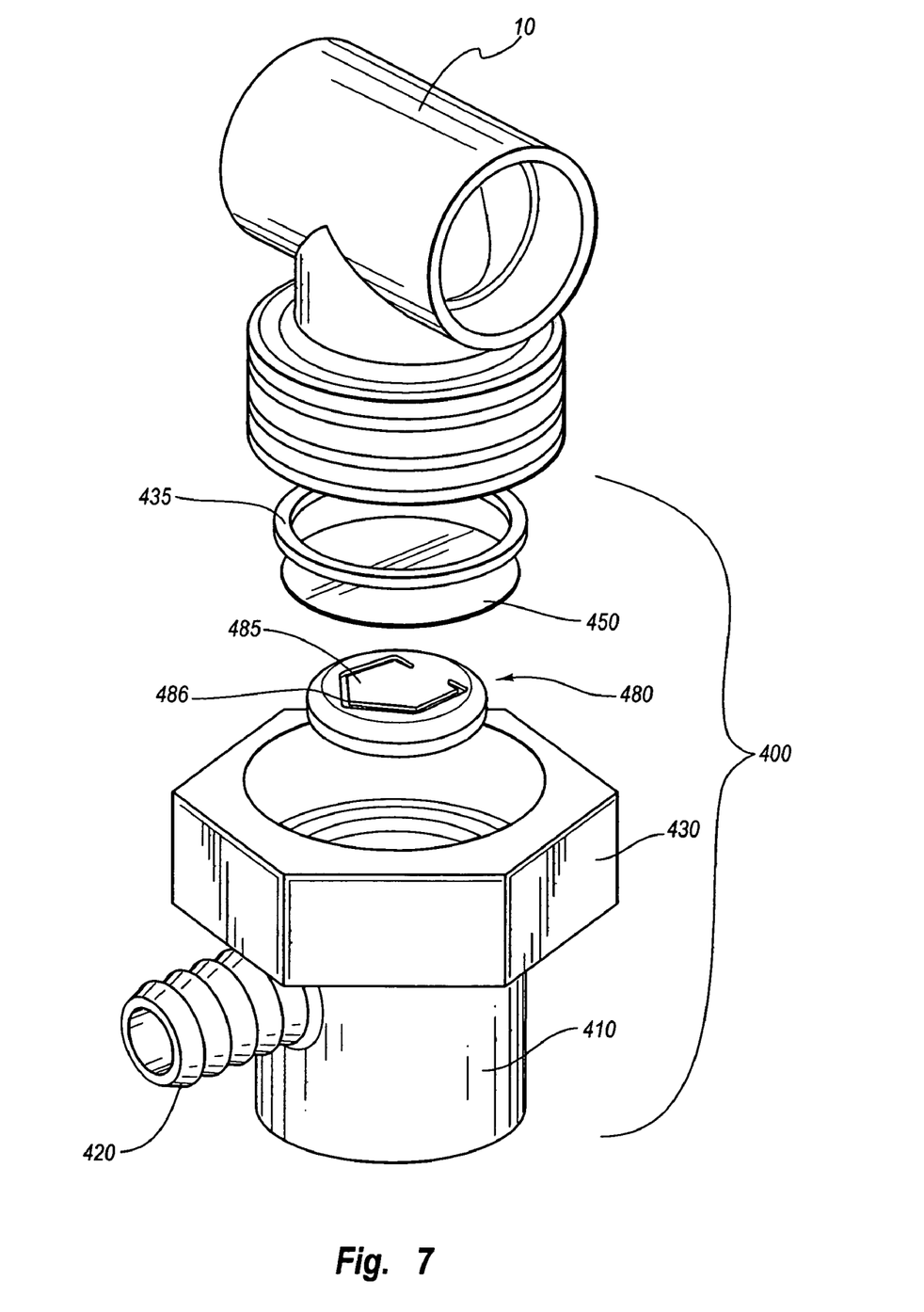
FIG. 7 is an exploded view of yet another embodiment of a relief valve including a cutter piece.
Figure 8:
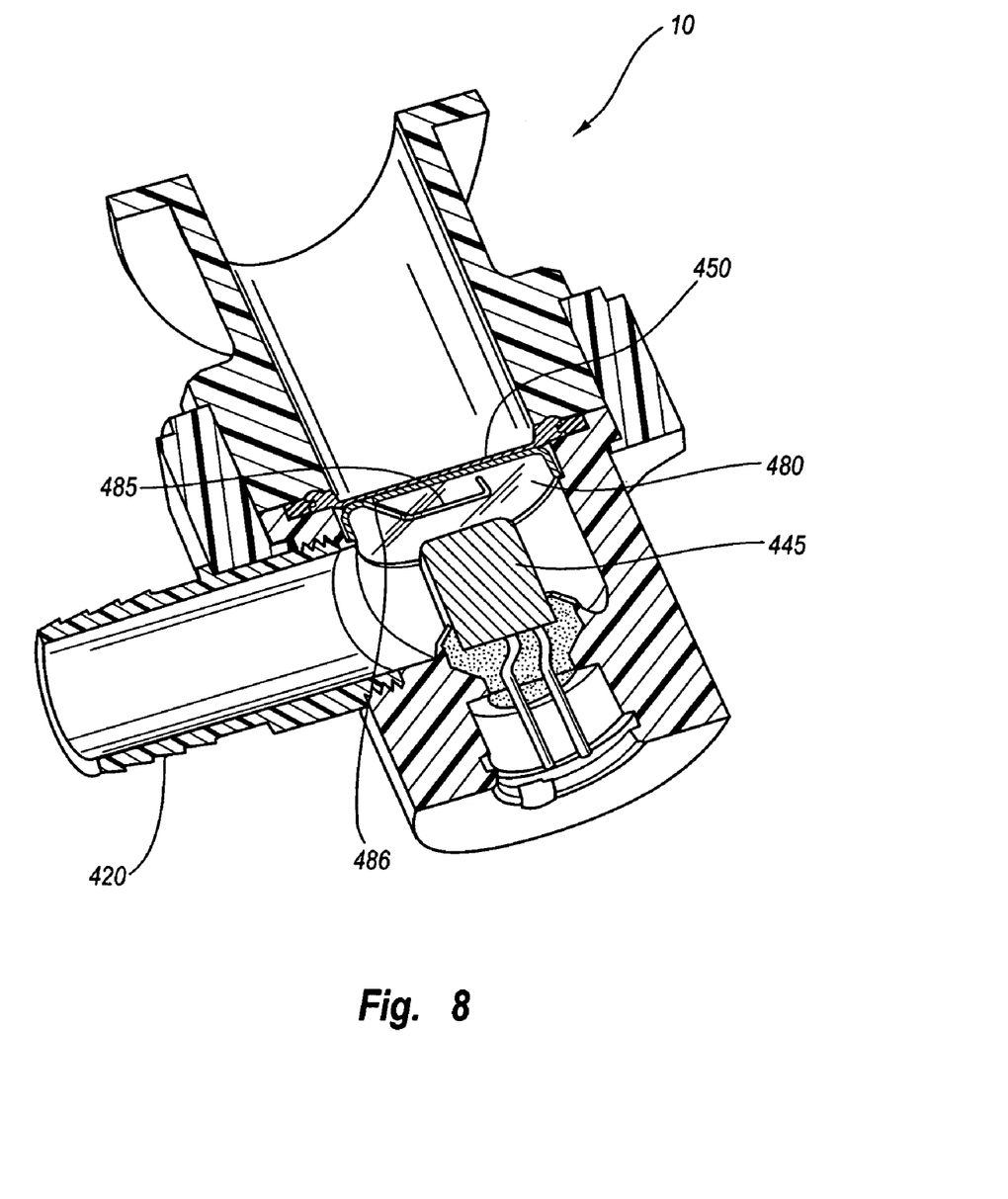
FIG. 8 is a cross-sectional view of the relief valve embodiment of FIG. 7.

FIGS. 7-8 depict yet another embodiment of the invention. Relief valve 400 in these figures includes body 410, hose nipple 420, connector piece 430, sealing washer 435, and rupture disc 450. Connector piece 430 in this embodiment comprises a nut. However, it should be understood that the connector piece may comprise any other structure capable of facilitating a sealing connection of the valve to a fluid distribution line, including a crimp sleeve, bayonet lock, another type of clamp, or any other suitable structure.

The embodiment of FIGS. 7-8 also includes a cutter piece 480. Cutter piece 480 may be positioned between initiator 445 and rupture disc 450. Cutter piece 480 facilitates puncturing of the rupture disc 450. In the depicted embodiments of the invention including a cutter piece, the cutter piece 480 is configured to puncture the rupture disc 450 upon deployment of the pyrotechnic initiator 445. Cutter piece is an example of cutting means for puncturing the valve means and thereby establishing fluid communication through the first opening.

The embodiment of cutter piece 480 shown in the accompanying figures includes a cutting member 485. Cutting member 485 is pivotably connected with cutter piece 480. If initiator 445 is positioned adjacent to cutter piece 480, this allows initiator 445 to force cutting member 485 to pivot about its axis on cutter piece 480 upon deployment of the initiator 445. Once cutting member 485 is forced to pivot away from cutter piece 480, it will make contact with the rupture disc 450 and will puncture the rupture disc and thereby allow for fluid communication therethrough.

As can best be seen in FIG. 8, cutting member 485 has a pointed tip 486. Pointed tip 486 further assists in puncturing rupture disc 450 by providing a small cross-sectional area with which to cause the initial puncture in the disc. In addition to, or instead of, including a pointed tip, embodiments of cutting members may include a raised and/or sharpened edge to further facilitate puncturing the rupture disc.

Figure 9:
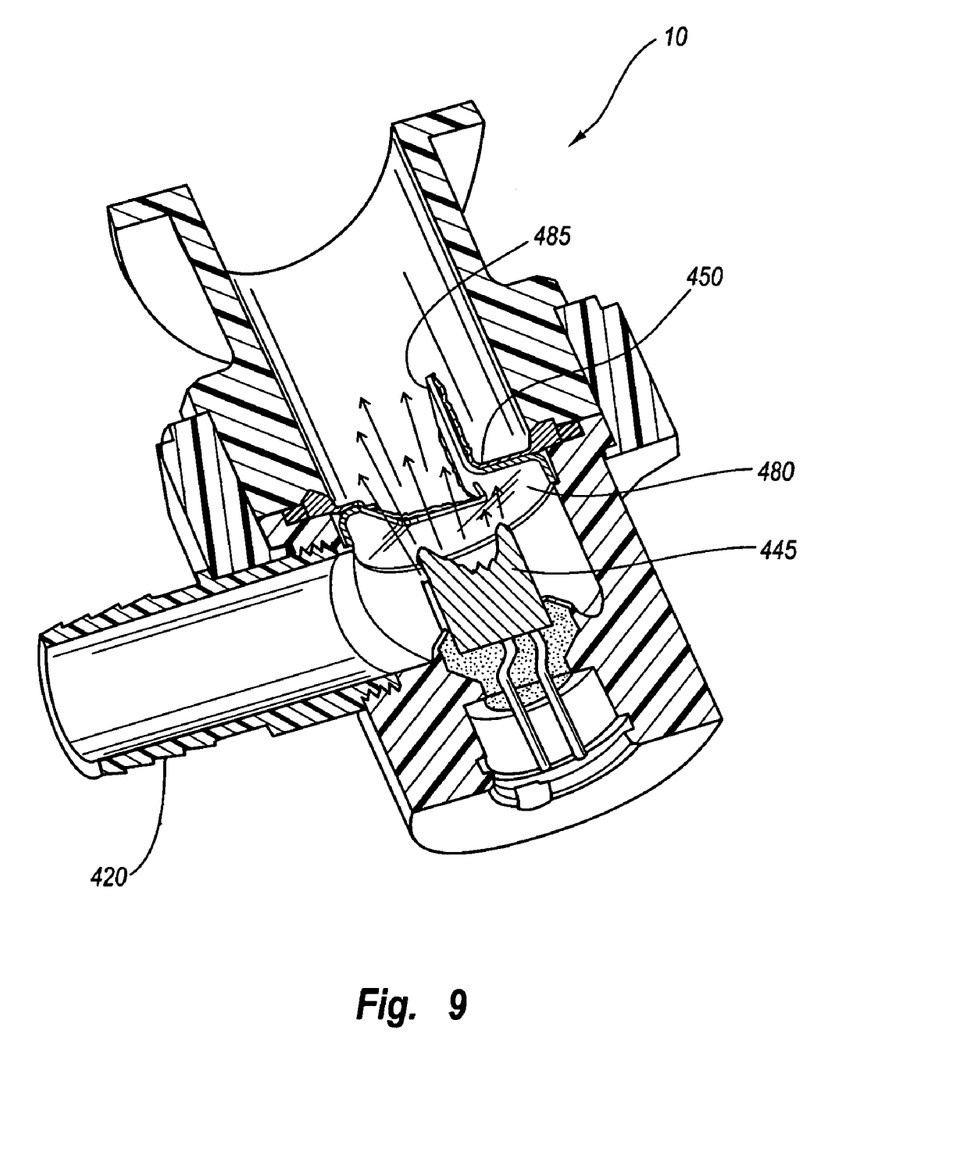
FIG. 9 is a cross-sectional view of the relief valve embodiment of FIG. 8 with a deployed cutting member.

FIG. 9 depicts cutter piece 480 with its cutting member 485 in its pivoted position away from cutter piece 480 as it would appear following deployment. As seen in the figure, rupture disc 450 has been punctured by cutting member 485, creating an opening to allow for fluid communication between cavity 415 and the opening leading to tee fitting 10.

Figure 10:
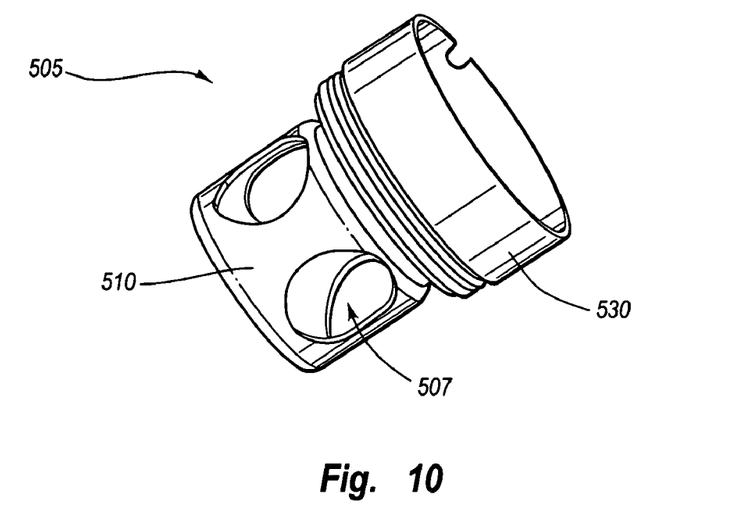
FIG. 10 is a perspective view of a support structure and crimp sleeve.
Figure 11:
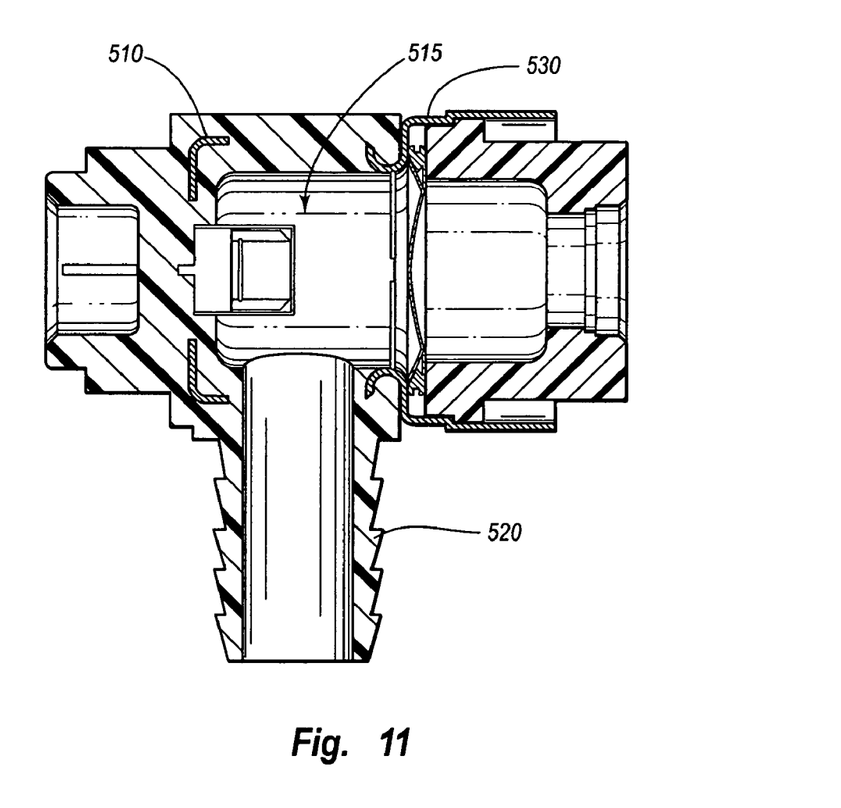
FIG. 11 is a cross-sectional view of a relief valve embodiment incorporating the support structure and crimp sleeve of FIG. 10.

In order to increase the strength of the device and allow it to withstand greater deployment forces, a support structure may be included with some embodiments of the invention. Such a support structure may optionally be formed with a crimp sleeve. For example, support structure 505 in FIG. 10 includes body portion 510 integrally formed with crimp sleeve portion 530. Support structure 505 surrounds and supports the initiator chamber 515, as shown in FIG. 11. Support structure 505 also includes apertures 507 formed in a sidewall of the structure. One aperture 507 facilitates fluid communication from chamber 515 through hose nipple 520. Additional apertures 507 allow plastic to bond around support structure 505. Of course, just a single aperture, at which hose nipple 520 is attached, may be used in alternative embodiments.

It will be obvious to those having skill in the art that many changes may be made to the details of the above-described embodiments without departing from the underlying principles of the invention. The scope of the present invention should, therefore, be determined only by the following claims. Note also that elements recited in means-plus-function format are intended to be construed in accordance with 35 U.S.C. § 112 ¶6.

The invention claimed is:
1. A relief valve comprising:
 a body defining a cavity and comprising at least first and second openings in fluid communication with the cavity;

a connector piece connected to the body at the first opening, wherein the connector piece is configured to facilitate a sealing connection with a fluid distribution line;

a rupture disc disposed within and obstructing the first opening; and a cutter piece comprising a cutting member pivotably connected with the cutter piece and positioned adjacent to the rupture disc, wherein the cutter piece is configured to facilitate puncturing of the rupture disc; further comprising a pyrotechnic initiator operatively coupled to the cutter piece.

2. The relief valve of claim 1, wherein the connector piece is a nut.

3. The relief valve of claim 1, wherein the connector piece is a crimp sleeve.

4. The relief valve of claim 3, wherein the crimp sleeve is integrally molded with the body.

5. The relief valve of claim 1, further comprising an electrical connector connected to the pyrotechnic initiator.

6. The relief valve of claim 1, wherein the pyrotechnic initiator is integrally molded with the body.

7. The relief valve of claim 1, wherein the rupture disc is positioned and aligned with the pyrotechnic initiator such that, upon deployment of the pyrotechnic initiator, the pyrotechnic initiator causes the cutting member to engage and rupture the rupture disc and thereby allow for fluid communication through the first opening.

8. The relief valve of claim 7, wherein the cutting member has a pointed tip.

9. The relief valve of claim 1, wherein the cutter piece is configured to puncture the rupture disc upon deployment of the pyrotechnic initiator.

10. The relief valve of claim 1, further comprising a hose nipple connected to the body at the second opening.

11. The relief valve of claim 10, wherein the hose nipple is integrally molded with the body.

12. The relief valve of claim 1, wherein the rupture disc is mounted within the connector piece.

13. The relief valve of claim 1, wherein a sealing washer is positioned between the connector piece and the rupture disc.

14. The relief valve of claim 1, further comprising a tee fitting connected to the body and in fluid communication with the cavity of the body at the first opening, wherein the tee fitting is connected to the body with the connector piece, and wherein the tee fitting is designed to be integrated with an automotive refrigerant line.

15. The relief valve of claim 1, wherein the first opening is oriented approximately perpendicular to the second opening.

16. The relief valve of claim 1, wherein the first opening is axially aligned with or approximately parallel to the second opening.

17. The relief valve of claim 1, wherein the body is formed from a plastic material.

18. The relief valve of claim 1, further comprising a support structure integrally molded with the body.

19. A relief valve comprising:

a body defining a cavity and comprising at least first and second openings in fluid communication with the cavity;

connecting means for facilitating a sealing connection with a fluid distribution line, wherein the connecting means is connected with the body at the first opening;

valve means for selectively controlling fluid communication therethrough, wherein the valve means is disposed within and obstructs the first opening; and means for puncturing the valve means by pivoting into the valve means to puncture the valve means and thereby establishing fluid communication through the first opening, wherein the means for puncturing is positioned adjacent to the valve means wherein said means for puncturing the valve means is coupled to a pyrotechnic initiator.

20. A relief valve comprising:

a body defining a cavity and comprising at least first and second openings in fluid communication with the cavity;

a support structure at least partially embedded within the body, wherein the support structure has an aperture formed in a sidewall of the support structure;

a pyrotechnic initiator integrally molded with the body;

a hose nipple integrally molded with the body at the second opening, wherein the body is in fluid communication with the hose nipple through the aperture in the support structure; and a rupture disc disposed within and obstructing the first opening, wherein the rupture disc is positioned and aligned with the pyrotechnic initiator such that, upon deployment of the pyrotechnic initiator, the pyrotechnic initiator ruptures the rupture disc and thereby allows for fluid communication through the first opening.

21. The relief valve of claim 20, wherein the support structure is integrally formed with a crimp sleeve.

22. The relief valve of claim 20, wherein the support structure has a plurality of apertures formed in a sidewall of the support structure.

* * * * *